United States Patent
Harkness (10) Patent No.: US 10,885,343 B1
(45) Date of Patent: Jan. 5, 2021

(54) REPAIRING MISSING FRAMES IN RECORDED VIDEO WITH MACHINE LEARNING

(71) Applicant: AMAZON TECHNOLOGIES, INC., Seattle, WA (US)

(72) Inventor: Kevin Harkness, Brooklyn, NY (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/556,489

(22) Filed: Aug. 30, 2019

(51) Int. Cl.
*G06N 3/08* (2006.01)
*G06K 9/00* (2006.01)
*G06K 9/62* (2006.01)
*G06N 3/04* (2006.01)

(52) U.S. Cl.
CPC ..... *G06K 9/00718* (2013.01); *G06K 9/00744* (2013.01); *G06K 9/6256* (2013.01); *G06K 9/6277* (2013.01); *G06N 3/0472* (2013.01); *G06N 3/08* (2013.01)

(58) Field of Classification Search
CPC .......... G06K 9/00718; G06K 9/00744; G06K 9/6256; G06K 9/6277; G06N 3/0472; G06N 3/08
See application file for complete search history.

(56) References Cited

U.S. PATENT DOCUMENTS

| 10,382,799 B1 * | 8/2019 | Walters | G06F 16/254 |
| 2011/0099444 A1 * | 4/2011 | Tredoux | G06F 11/08 714/746 |
| 2013/0290557 A1 * | 10/2013 | Baratz | H04N 21/8456 709/231 |
| 2015/0009278 A1 * | 1/2015 | Modai | H04N 7/15 348/14.08 |
| 2020/0098139 A1 * | 3/2020 | Kaplanyan | G06N 20/00 |

OTHER PUBLICATIONS

Niklaus, Simon et al. "Video Frame Interpolation via Adaptive Separable Convolution." arXiv:1708.01692v1 [cs.CV] Aug. 5, 2017, pp. 1-10. Retrieved from https://arvix.org/abs/1708.01692.

* cited by examiner

*Primary Examiner* — Thai Q Tran
*Assistant Examiner* — Jose M Mesa
(74) *Attorney, Agent, or Firm* — Lee & Hayes, P.C.

(57) ABSTRACT

Repairing missing frames in a video includes obtaining video data from an image capture system, applying a first neural network model to the video data to detect that one or more frames are missing, where the first neural network model has been trained to detect missing frames based on training data in which an artificial gap has been introduced. In response to detecting that the one or more frames are missing, a second model is applied to the video data to generate one or more replacement frames. The one or more replacement frames are based on at least a first frame prior to the detected dropped one or more frames, and a second frame after the detected dropped one or more frames. Modified video data is generated using the plurality of frames and the replacement frames.

20 Claims, 5 Drawing Sheets

REPAIRING MISSING FRAMES IN RECORDED VIDEO WITH MACHINE LEARNING

BACKGROUND

With the rise of mobile devices, users have started to capture more and more videos. Those videos may be stored locally to a user's device, such as a mobile phone or other consumer-owned device with image capturing capabilities. In addition, recorded videos may be stored to cloud storage for security, durability, and ease of viewing across devices. These mobile devices may provide high video and photo quality, but they are not without flaws. One issue that can arise is missing frames within captured video. Frames in recorded video may be missing due to a variety of issues such as poor device hardware or background processes consuming too many system resources at the time of recording. This results in a jarring playback experience where the video may appear to momentarily freeze for typically brief moments. What is needed is a technique for detecting and addressing missing frames in recorded videos.

BRIEF DESCRIPTION OF THE DRAWINGS

For a detailed description of various examples, reference will now be made to the accompanying drawings in which.

DETAILED DESCRIPTION

Missing frames may arise when frames are dropped from a video for a number of reasons. For example, as a video recording is being constructed, a device may drop some frames. Further, issues ranging from low quality SD cards with poor read/write performance to temporary upticks in CPU, GPU, or memory usage on a device may hamper the recording and transcoding of the video, preventing the device from keeping up with the feed of data from the camera. Other system modifications may also contribute to missing frames, such as updates to an operating system. Generally, these types of system issues may result in video performance degradation issues on devices.

In one or more embodiments, neural networks may be utilized to detect the missing frames or dropping of frames in recorded videos. For example, it may be possible to programmatically detect if a given video is missing some frames, or artificial intelligence may be used to improve detection of dropped frames in a recorded video. As an example, a neural network architecture, such as a recurrent neural network ("RNN") or other type of neural network architecture can be trained to detect when frames are dropped. As an example, training video data may be used to train a model to detect when frames are missing by training using video data in which frames have intentionally been removed.

Another model may be trained to repair the detected time slots which were determined to be missing video frames, for example according to the model described above. For example, a generative query network ("GQN"), generative adversarial network ("GAN"), or other generative network may be trained to predict what the scene would look like during the time slots in which the video frames are missing. According to one or more embodiments, a generative neural network may provide improved replacement frames through training. Trained generative networks can not only interpolate between camera angles, but can predict and re-create occlusions in a scene.

According to one or more embodiments, machine learning may be utilized to predict when an artificial gap may be introduced into a video during recording time. As an example, system resources may be monitored so that while video is being captured by the system, the system can predict the possibility that an error will be introduced. Further, a message may be presented to a user prompting the user to select whether further analysis on the video should be performed and/or whether the video should be repaired.

In the following description, numerous specific details are set forth to provide a thorough understanding of the various techniques. As part of this description, some of the drawings represent structures and devices in block diagram form. In this context, it should be understood that references to numbered drawing elements without associated identifiers (e.g., 100) refer to all instances of the drawing element with identifiers (e.g., 100a and 100b). Further, as part of this description, some of this disclosure's drawings may be provided in the form of a flow diagram. The boxes in any particular flow diagram may be presented in a particular order. However, it should be understood that the particular flow of any flow diagram is used only to exemplify one embodiment. In other embodiments, any of the various components depicted in the flow diagram may be omitted, or the components may be performed in a different order, or even concurrently. In addition, other embodiments may include additional steps not depicted as part of the flow diagram. Further, the various steps may be described as being performed by particular modules or components. It should be understood that the language used in this disclosure has been principally selected for readability and instructional purposes, and may not have been selected to delineate or circumscribe the disclosed subject matter. As such, the various processes may be performed by alternate components than the ones described.

Reference in this disclosure to "one embodiment" or to "an embodiment" means that a particular feature, structure, or characteristic described in connection with the embodiment is included in at least one embodiment, and multiple references to "one embodiment" or to "an embodiment" should not be understood as necessarily all referring to the same embodiment or to different embodiments.

Figure 1:
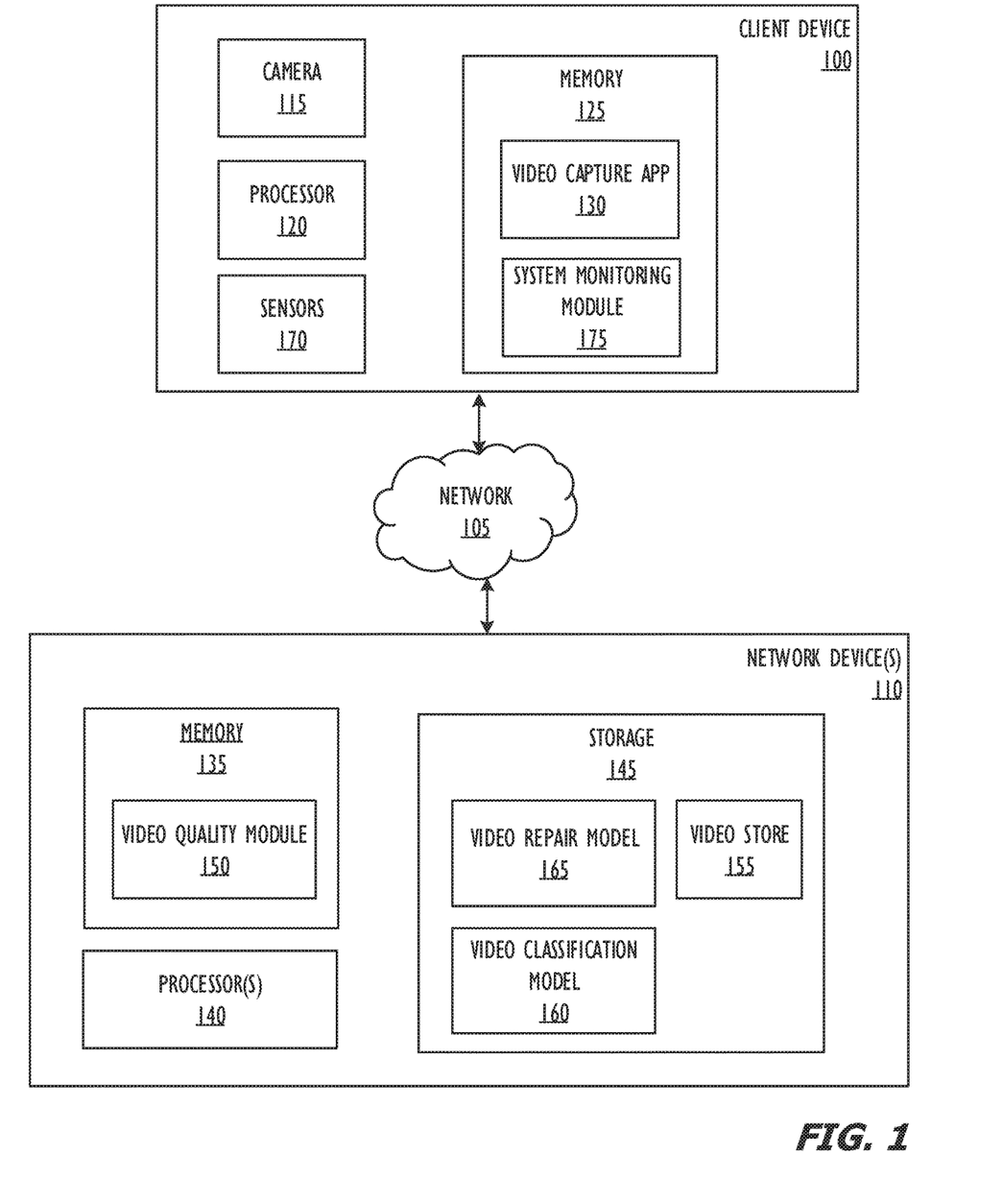
FIG. 1 shows an example network diagram in which aspects of the disclosure may be practiced, according to one or more embodiments.

FIG. 1 shows an example network diagram comprising components which may be utilized for various techniques described herein, according to one or more embodiments. FIG. 1 includes a client device 100 connected to one or more network devices 110 over a network 105. Client device 100 may comprise a personal computer, a tablet device, a smart phone, a smart wearable device, base station, network device, or any other electronic device which may be used to capture and/or manage images captured by a camera. The network 105 may comprise one or more wired or wireless networks, wide area networks, local area networks, short range networks, etc. Users of the client device 100 can interact with the network devices 110 to access services controlled and/or provided by the network devices 110.

Client device 100 may include one or more processors 120. Processor 120 may include multiple processors of the same or different type. Client device 100 may also include a memory 125. Memory 125 may each include one or more different types of memory, which may be used for performing functions in conjunction with processor 120. For example, memory 125 may include cache, ROM, RAM, or any kind of transitory or non-transitory computer readable storage medium capable of storing computer readable code which may be executed by processor 120. Memory 125 may store various programming modules for execution by processor 120, including video capture application 130.

In one or more embodiments, client device 100 may include camera 115. Camera 115 may include one or more cameras from which image data may be captured. Image data may include, for example, still photos, video images, and the like. A user of client device 100 may capture image data and manage image data captured by the camera using the video capture application 130. In one or more embodiments, the video capture application may be used by a user to capture image data by the camera 115. In one or more embodiments, the video capture application 130 may manage video captured by camera 115, or may communicably connect to network device 110 to utilize functionality across a network to manage the videos and/or other image data captured by client device 100. As an example, videos captured by camera 115 may be analyzed by video capture application 130 to determine whether the video has dropped frames, or the video capture application 130 may transmit the video data to network device 110 for further analysis. In addition, the video capture application 130 may repair a video determined to have dropped frames, or may transmit the video to network device 110 for repair. According to one or more embodiments, client device 100 may store videos locally, or may transmit them across network 105 to network storage, such as video store 155 of network device 110.

The client device 100 may also include a system monitoring module 175. System monitoring module 175 may monitor various resources of client device 100. In one or more embodiments, the system monitoring module may begin monitoring system resources in response to detecting that video is being captured, or may be about to be captured. For example, the system monitoring module may detect or be notified that the video capture application 130 is open, and/or the system monitoring module 175 may detect that the status of the resources of the client device 100 may cause degradation in the image capture system. As an example, issues ranging from low quality SD cards with poor performance to temporary upticks in CPU, GPU, or memory usage on a device may hamper the recording and transcoding of the video. The system monitoring module 175 may monitor system resources, in part, based on sensor data from sensors 170 of client device 100. As an example, the system resources may include a temperature of the system, as well as other physical properties, along with other properties of the system, such as memory usage, CPU usage, GPU usage, operating system version, current frame rate, age of the device, memory properties, and the like. Although shown in memory 135, the system monitoring module may be located differently within the client device 100. As an example, the system monitoring module 175 may be located on separate hardware, such as a dedicated system-on-chip.

Network device 110 may include similar components and functionality as those described in client device 100. Specifically, network device may include a memory 135, storage 145, and one or more processors 140. As described above, memory 135 may include cache, ROM, RAM, or any kind of transitory or non-transitory computer readable storage medium capable of storing computer readable code which may be executed by processor 140. Storage 145 may include may include storage media or memory media such as semiconductor storage, magnetic or optical media, e.g., disk or CD/DVD-ROM, or other storage technologies.

Storage 145 may include various data stores, such as video store 155. In one or more embodiments, video store 155 may be utilized to store image data, such as photos captured by client device 100, in network storage. Storage 145 may also include models which may be used for detecting issues in captured video data and/or repairing video data. as such, storage 145 may include video repair model 165, and video classification model 160. Video classification model 160 may be a trained neural network which is trained to detect when a video has dropped frames. In one or more embodiments, the video classification model 160 may determine a likelihood that a given video has dropped frames based on the model. Similarly, video repair model 165 may be a trained neural network which will provide replacement frames based on a given video frame and a time span at which frames are determined to be missing.

Although client device 100 and network device 110 are depicted as comprising the numerous components described above, in one or more embodiments, the various components may be distributed differently, or across additional devices (e.g., multiple client devices and/or multiple network devices). Particularly, in one or more embodiments, one or more of the video capture application 130, system monitoring module 175, video quality module 150, video repair model, video classification model 160, and video store 155 may be distributed differently across the client device 100 and network device 110. The various applications and modules including video capture application 130, system monitoring module 175, and video quality module 150 may include computer readable code executable by one or more processors, such as processor 120 and/or processor 140. Accordingly, although certain calls and transmissions are described herein with respect to the particular systems as depicted, in one or more embodiments, the various calls and transmissions may be made differently directed based on the differently distributed functionality. Further, additional components may be used, some combination of the functionality of any of the components may be combined.

Figure 2:
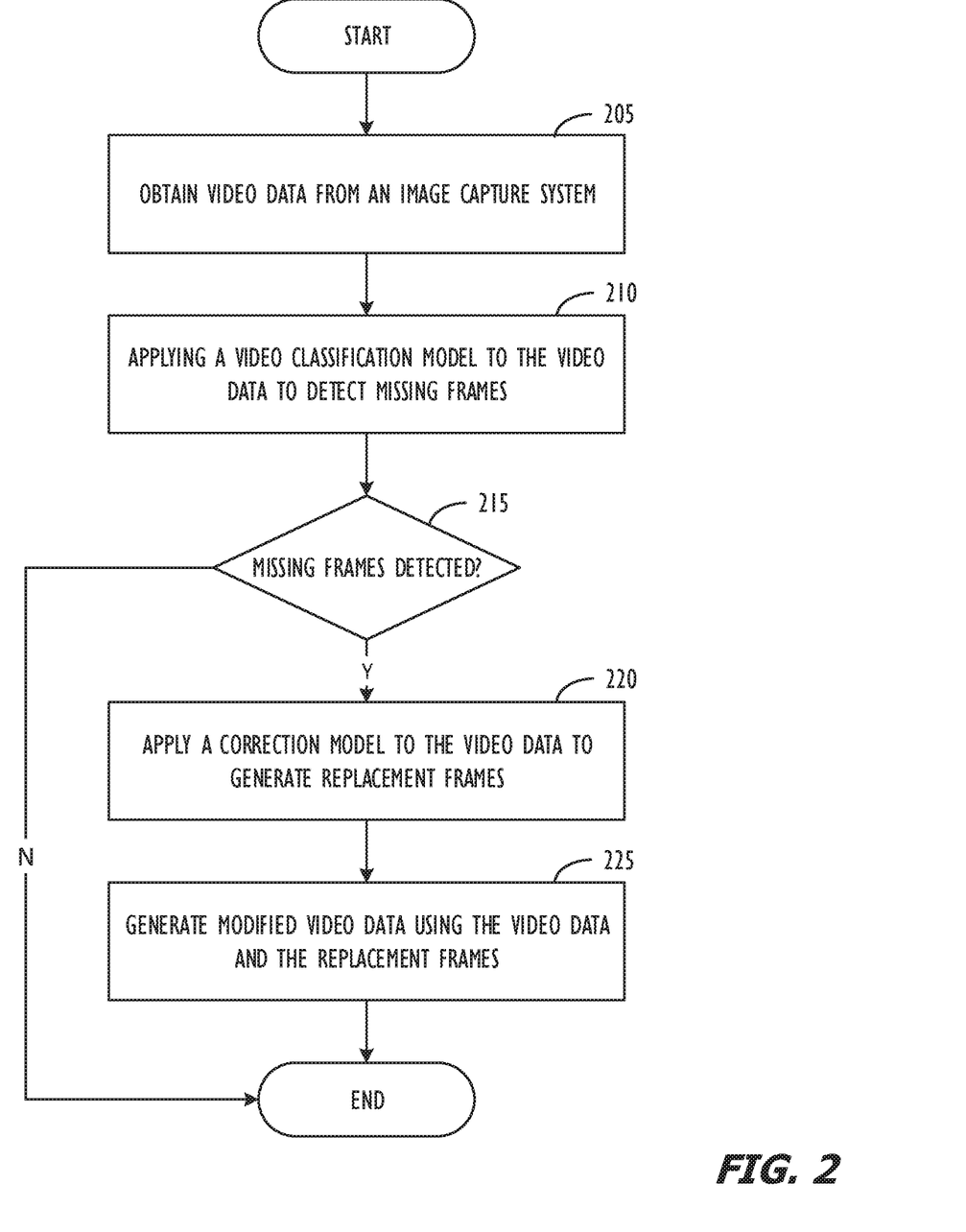
FIG. 2 illustrates a flowchart of a method for detecting and correcting a video with missing frames, according to one or more embodiments.

FIG. 2 illustrates a flowchart of a method for detecting and correcting a video with missing frames, according to one or more embodiments. For purposes of explanation, the following steps will be described in the context of FIG. 1. However, it should be understood that the various actions may be taken by alternate components. In addition, the various actions may be performed in a different order. Further, some actions may be performed simultaneously, and some may not be required, or others may be added.

At 205, the video capture application 130 obtains video data from an image capture system. The image capture system may include camera 115, for example. A video capture application may be any application which may be utilized within the client device 100 to capture video data using camera 115 in the form of a temporal series of frames.

The flowchart continues at 210 where the video capture application 130 applies a video classification model to the video data to detect dropped frames. As will be discussed in further detail with respect to FIG. 3, the video classification model may be obtained by training a video classification neural network to detect when videos are missing frames. According to one or more embodiments, the missing frames may be detected at various points in the recording pipeline. For example, the missing frame issue may arise during recording of the video. As an example, because devices only have so much available memory, some amount of video data may be lost if insufficient memory is available. In one or more embodiments, the missing frames may be detected after the video has been recorded. For example, once a user has stopped recording video, the quality module on the device could examine the recorded vide file to detect that frames have been dropped or otherwise not recorded.

At 215, a determination is made regarding whether missing frames are detected. In one or more embodiments, the video quality model may provide a probability that the video contains dropped frames. The determination may be made by comparing the probability that the video contains dropped frames with a predetermined threshold value.

If at 215, it is determined that the video does not have missing frames, then the flowchart ends. However, returning to 215, if it is determined that dropped frames are detected, then the flowchart continues at 220, where the video capture application applies a correction model to the video data to generate replacement frames. In one or more embodiments, the correction may be performed by the client device 100. Additionally, or alternatively, the client device 100 may transmit the video to a remote device, such as network device 100 for correction. The correction model may utilize a trained neural network to determine missing frames. In one or more embodiments, the time span in which frames are missing may be determined by the correction model. Additionally, or alternatively, the time span in which frames are missing may be determined and provided by the classification model. In one or more embodiments, a number of dropped or missing frames may be determined based on a frame rate at which the video data was captured, and the time span in which the frames are determined to be missing. The correction model may then generate replacement frames for the missing frames.

According to one or more embodiments, the replacement frames may be generated by identifying one or more frames prior to the dropped frames, and one or more frames after the dropped frames in the video data. In one or more embodiments, the missing frames may be interpolated based on the one or more frames prior to the dropped frames and the one or more frames after the dropped frames. In one or more embodiments, the replacement frames may be generated by a generative network.

The flowchart concludes at 225 where the video capture application 130 generates modified video data using the video data and the replacement frames. In one or more embodiments, the replacement frames may be inserted into the video data in place of the dropped frames. Alternatively, or additionally, the replacement frames may be stored in a separate memory location, either on the same recording device or a separate memory device, such as a secondary storage device and/or cloud storage. A reference may be recorded for the time span in which the frames are determined to be missing which references the secondary storage in which the replacement frames are stored.

Figure 3:
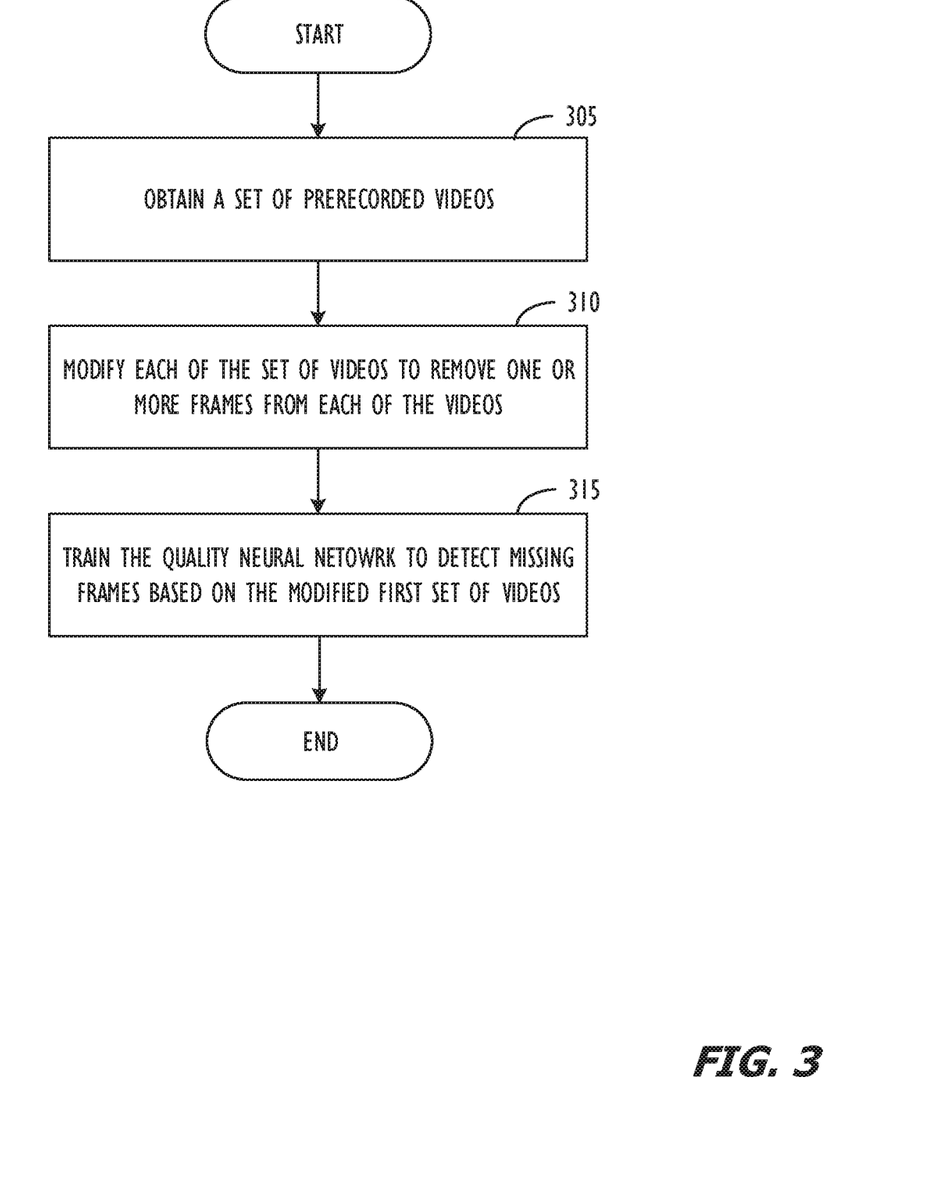
FIG. 3 illustrates a flowchart for training a neural network model to detect missing frames, according to one or more embodiments.

FIG. 3 illustrates a flowchart for training a neural network model to detect missing frames, according to one or more embodiments. For purposes of explanation, the following steps will be described in the context of FIG. 1. However, it should be understood that the various actions may be taken by alternate components. In addition, the various actions may be performed in a different order. Further, some actions may be performed simultaneously, and some may not be required, or others may be added.

The flowchart begins at 305 where a set of prerecorded videos are obtained. Prerecorded videos may be obtained from client device 100 or network device 110. Further, the prerecorded videos may have been captured by a single device or a plurality of devices. In one or more embodiments, the prerecorded videos may be obtained from a single source or from multiple sources.

The flowchart continues at 310, where each of the set of videos is modified to remove one or more frames from each of the videos. In one or more embodiments, a rendering module may be utilized to modify the videos to remove the frames. For example, a video file may be rendered to remove frames previously part of the video file.

The flowchart concludes at 315 where the quality neural network is trained to detect missing frames based on the modified set of videos. In one or more embodiments, the quality neural network may be a recurrent neural network or other neural network architecture in which connections between nodes are formed along a temporal sequence. As such, the neural network may be trained to detect when a next frame in a sequence is missing within a sequence of frames of video data.

Figure 4:
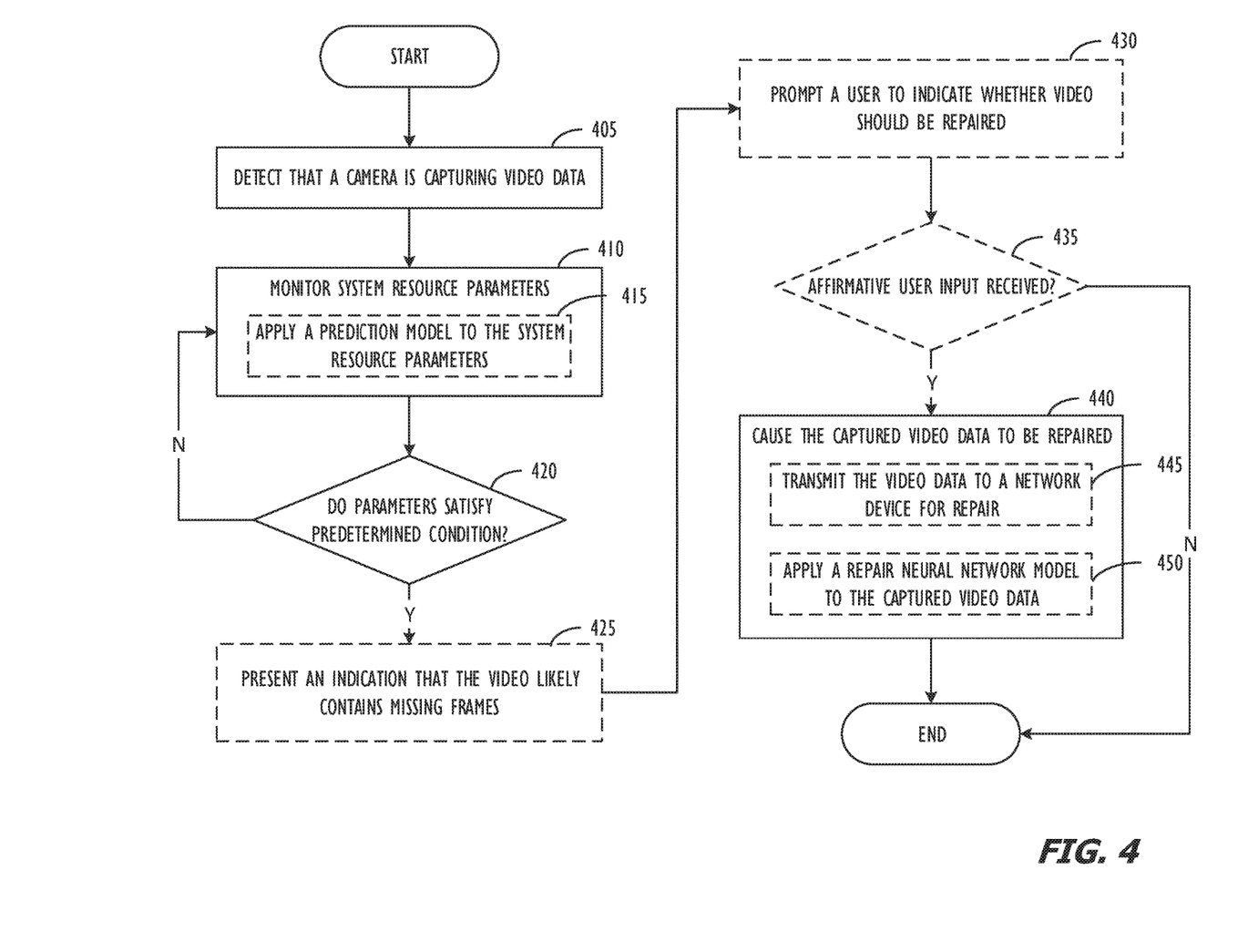
FIG. 4 illustrates a flowchart of a method for predicting when an artificial gap may be introduced into a video, according to one or more embodiments.

FIG. 4 illustrates a flowchart of a method for predicting when an artificial gap may be introduced into a video, according to one or more embodiments. For purposes of explanation, the following steps will be described in the context of FIG. 1. However, it should be understood that the various actions may be taken by alternate components. In addition, the various actions may be performed in a different order. Further, some actions may be performed simultaneously, and some may not be required, or others may be added.

The flowchart begins at 405 where a system detects that a camera is capturing video data. In one or more embodiments, the detection may occur when a video or camera application is open, when a video capture selection is made within a camera application, when video begins to be recorded, and the like.

The flowchart continues at 410 where the system monitoring module 175 begins monitoring system resources. In one or more embodiments, various resources and characteristics of the system may be monitored. As an example, some system resources which may be monitored may include memory usage, CPU usage, GPU usage, operating system version, temperature of the system, current frame rate, age of the device, memory card properties, and the like. In one or more embodiments, at 415, a prediction model may be applied to the system resource parameters to predict whether frames are likely to be missing. In one or more embodiments, the prediction model may be a trained model to detect when a particular resource parameter or combination of resource parameters may cause frames to be missing.

The flowchart continues at 420 where a determination is made regarding whether the system resource parameters satisfy a predetermined condition. In one or more embodiments, the predetermined condition may be a predetermined combination of parameters which may be known as likely to cause missing frames to be introduced into a video. The predetermined combination of parameters may be associated with a likelihood that a device associated with the monitored system resources will introduce missing frames. Thus, at 420, a determination may be made that the parameters satisfy a predetermined condition when a likelihood that the system resources may introduce missing frames into a video satisfies a predetermined likelihood threshold. As another example, if at 415 the prediction model provides a likelihood that the system resources may introduce missing frames into a video, then the likelihood may be compared against a predetermined likelihood threshold. If at 420 a determination is made that the parameters do not satisfy a predetermined condition, then the flowchart returns to 410 and the system monitoring module 175 continues to monitor system resource parameters.

Returning to 420, if a determination is made that the system resource parameters satisfy a predetermined condition, then the flowchart continues at 425 and an indication is presented that the video likely contains dropped frames. In one or more embodiments, the indication may be presented, for example, as a message on a display of the client device 100. As another example, the indication may be presented in audio format or other presentation format.

The flowchart continues at 430 where the system monitoring module 175 prompts a user to indicate whether the recorded video should be repaired. In one or more embodiments, the prompt may be presented on a user interface. The prompt may also provide a user input module in which a user may provide user input triggering repair of the video. The user input module may include, for example, a checkbox, a button, and the like. Further, the user input may be accepted as audio input and the like. If at 435 a determination is made that affirmative user input is not received, for example, if a user selects or otherwise indicates that the video should not be repaired, then the flowchart concludes.

As depicted, blocks 425-435 may be optional according to one or more embodiments. For example, upon determining at 420 that the resource parameters render the system likely to produce a video with missing frames, then the flowchart may continue to 440, where the capture video data may be repaired, as will be described below. As such, the repair may be performed seamlessly without use notification or user input, according to one or more embodiments.

Returning to block 435, if a determination is made that affirmative user input is received (e.g., the user input indicate that the video should be repaired), then the flowchart continues at 440, where the captured video data is caused to be repaired. In one or more embodiments, as shown at block 445, the client device 100 may transmit the video data to a network device for repair. For example, network device 110 may include a video repair module 165 which may be utilized by a video quality module 150 to repair the video as describe, for example, in FIG. 2. Alternatively, at 450, the client device 100 may apply a repair model locally to the video data to generate replacement frames and repair the video as described, for example, in FIG. 2.

Figure 5:
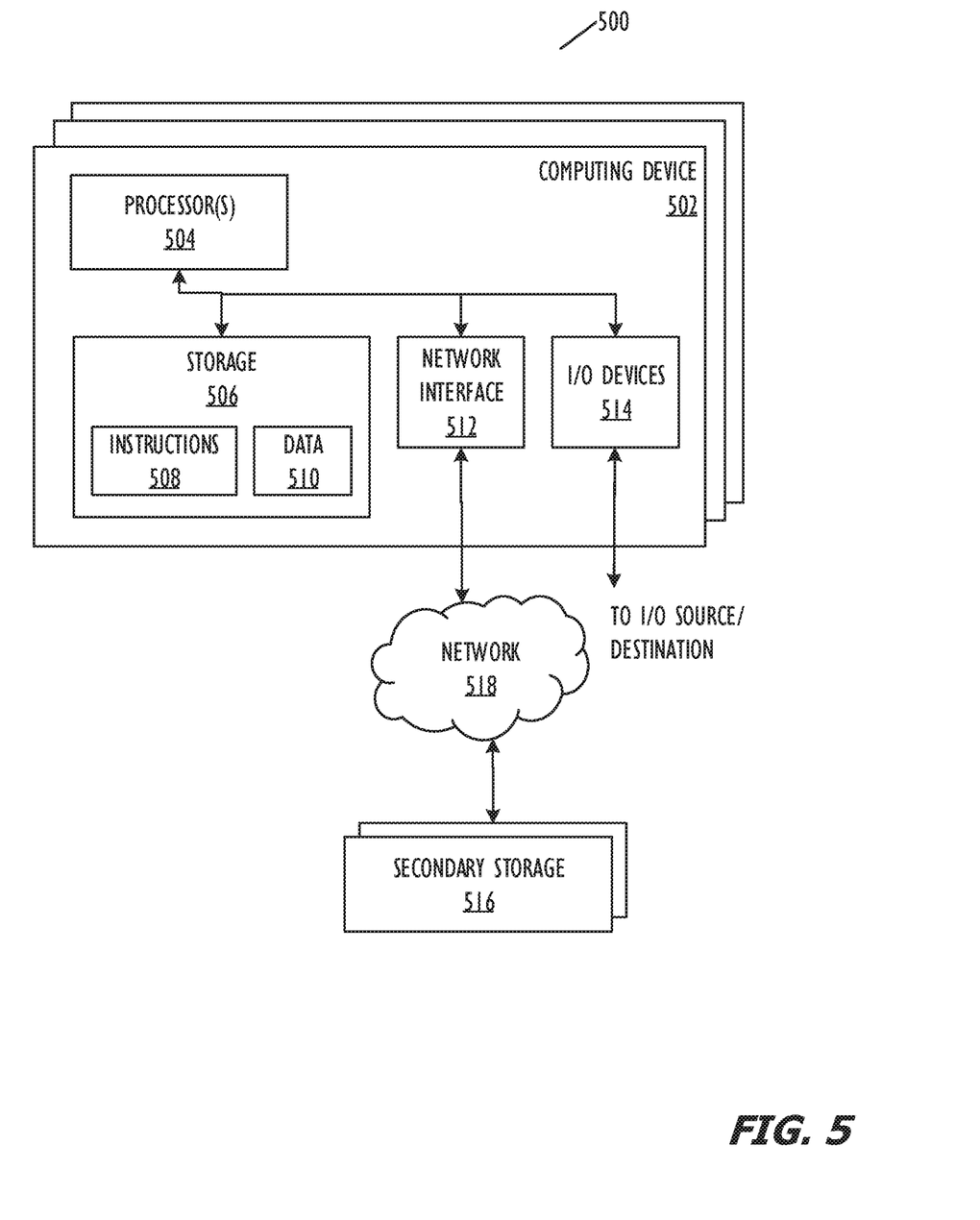
FIG. 5 shows an example of a hardware system for implementation of the improved clustering techniques in accordance with the disclosed embodiments.

FIG. 5 shows a schematic diagram for a computing system 500 suitable for implementation of any of the components of the client device 100 or network device 110 as described herein in accordance with various embodiments. The system includes one or more computing devices 502. The computing system 500 includes the computing devices 502 and secondary storage 516 communicatively coupled together via a network 518. One or more of the computing devices 502 and associated secondary storage 516 may be used to provide the functionality of the various components described herein.

Each computing device 502 includes one or more processors 504 coupled to a storage device 506, network interface 512, and I/O devices 514. In some embodiments, a computing device 502 may implement the functionality of more than one component of the system 100. In various embodiments, a computing device 502 may be a uniprocessor system including one processor 504, or a multiprocessor system including several processors 504 (e.g., two, four, eight, or another suitable number). Processors 504 may be any suitable processor capable of executing instructions. For example, in various embodiments, processors 504 may be general-purpose or embedded microprocessors implementing any of a variety of instruction set architectures ("ISAs"), such as the x86, PowerPC, SPARC, or MIPS ISAs, or any other suitable ISA. In multiprocessor systems, each of processors 504 may, but not necessarily, commonly implement the same ISA. Similarly, in a distributed computing system such as one that collectively implements the network 105, each of the computing devices 502 may implement the same ISA, or individual computing nodes and/or replica groups of nodes may implement different ISAs.

The storage device 506 may include a non-transitory, computer-readable storage device configured to store program instructions 508 and/or data 510 accessible by processor(s) 504. The storage device 506 also may be used to store the machine images as explained above. The storage device 506 may be implemented using any suitable volatile memory (e.g., random access memory), non-volatile storage (magnetic storage such as a hard disk drive, optical storage, solid storage, etc.). Program instructions 508 and data 510 implementing the functionality disclosed herein are stored within storage device 506. For example, instructions 508 may include instructions that when executed by processor(s) 504 implement the various services and/or other components of the service provider's network disclosed herein.

Secondary storage 516 may include additional volatile or non-volatile storage and storage devices for storing information such as program instructions and/or data as described herein for implementing the various aspects of the service provider's network described herein. The secondary storage 516 may include various types of computer readable media accessible by the computing devices 502 via the network 518. A computer readable medium may include storage media or memory media such as semiconductor storage, magnetic or optical media, e.g., disk or CD/DVD-ROM, or other storage technologies and maybe transitory or non-transitory. Program instructions and data stored on the secondary storage 516 may be transmitted to a computing device 502 for execution by a processor 504 by transmission media or signals via the network 518, which may be a wired or wireless network or a combination thereof. Each of the components described herein may be implemented as a separate computing device 502 executing software to provide the computing node with the functionality described herein. In some embodiments, some or all of the various services may be implemented by the same computing device.

The network interface 512 may be configured to allow data to be exchanged between computing devices 502 and/or other devices coupled to the network 518 (such as other computer systems, communication devices, input/output devices, or external storage devices). The network interface 512 may support communication via wired or wireless data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 514 may include one or more display terminals, keyboards, keypads, touchpads, mice, scanning devices, voice or optical recognition devices, or any other devices suitable for entering or retrieving data by one or more computing devices 502. Multiple input/output devices 514 may be present in a computing device 502 or may be distributed on various computing devices 502 of the system 500. In some embodiments, similar input/output devices may be separate from computing device 502 and may interact with one or more computing devices 502 of the system 500 through a wired or wireless connection, such as over network interface 512.

References to "based on" should be interpreted as "based at least on." For example, if a determination of a value or condition is "based on" a value of Y, then the determination is based at least on the value of Y; the determination may be based on other values as well.

Those skilled in the art will also appreciate that in some embodiments the functionality disclosed herein may be provided in alternative ways, such as being split among more software modules or routines or consolidated into fewer modules or routines. Similarly, in some embodiments illustrated methods may provide more or less functionality than is described, such as when other illustrated methods instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. The various methods as depicted in the figures and described herein represent illustrative embodiments of methods. The methods may be implemented in software, in hardware, or in a combination thereof in various embodiments. Similarly, the order of any method may be changed, and various elements may be added, reordered, combined, omitted, modified, etc., in various embodiments.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

What is claimed is:

1. A method for repairing missing frames in a video, comprising:
   obtaining video data comprising a plurality of frames from an image capture system;
   applying a first neural network model to the video data to detect that one or more frames are missing, wherein the first neural network model has been trained to detect missing frames based on training data in which an artificial gap has been introduced;
   in response to detecting that the one or more frames are missing, applying a second model to the plurality of frames to generate one or more replacement frames, wherein the one or more replacement frames are based on at least a first frame of the plurality of frames prior to the one or more frames, and a second frame of the plurality of frames after the one or more frames; and
   generating modified video data using the plurality of frames and the one or more replacement frames.

2. The method of claim 1, wherein the first neural network model is trained by:
   obtaining a plurality of additional videos that are determined to not be missing frames;
   generating modified additional videos by modifying each of the plurality of additional videos to remove one or more additional frames from each of the videos; and
   training the first neural network to detect missing frames based on the modified additional videos.

3. The method of claim 1, further comprising:
   detecting that the image capture system is capturing additional video data;
   in response to detecting that the image capture system is capturing additional video data, monitoring resources for the image capture system;
   detecting, based on the monitoring of the resources, that one or more parameters for the resources for the image capture system satisfy a predetermined condition; and
   in response to determining that the one or more parameters for the resources satisfy the predetermined condition:
      presenting an indication indicating that the image capture system will introduce missing frames into the additional video data, and
      prompting a user to indicate whether the additional video data is to be repaired.

4. The method of claim 3, further comprising:
   in response to an affirmative response from the user, repairing the additional video data using the second model.

5. A non-transitory computer readable medium comprising computer readable code for repairing missing frames in recorded video data, executable by one or more processors to:
   obtain video data comprising a plurality of frames from an image capture system;
   detect that one or more frames of the video data are missing;
   in response to detecting that the one or more frames are missing, generate one or more replacement frames based on a first frame of the plurality of frames prior to the one or more frames, and a second frame of the plurality of frames after the one or more frames; and
   generate modified video data using the plurality of frames and the one or more replacement frames.

6. The non-transitory computer readable medium of claim 5, wherein the one or more frames are detected to be missing by applying a classification neural network model to the video data.

7. The non-transitory computer readable medium of claim 6, wherein the classification neural network model is trained by:
   obtaining a plurality of additional videos that are determined to not be missing frames;
   generating modified videos by modifying each of the plurality of additional videos to remove one or more additional frames from each of the plurality of additional videos; and
   training the classification neural network model to detect missing frames based on the modified videos.

8. The non-transitory computer readable medium of claim 7, wherein each of the plurality of additional videos is modified to remove the one or more additional frames using a rendering module.

9. The non-transitory computer readable medium of claim 6, wherein applying the classification network model to the video data to detect that the one or more frames are missing comprises:
   determining a probability that the one or more frames are missing based on the classification neural network model, and detecting that the one or more frames are missing based on the probability satisfying a predetermined threshold.

10. The non-transitory computer readable medium of claim 5, wherein the one or more replacement frames are generated by interpolating the one or more replacement frames from the first frame and the second frame.

11. The non-transitory computer readable medium of claim 5, wherein the one or more replacement frames are generated by a generative network.

12. The non-transitory computer readable medium of claim 11, wherein the first frame is captured from a first point of view and the second frame is captured from a second point of view, and wherein the generative network generates one of the one or more replacement frames from a third point of view that is different from the first point of view and the second point of view, and wherein at least one of the one or more replacement frames depicts an occlusion in a captured environment that is not present in the first frame or the second frame.

13. A system for repairing missing frames in a video, comprising:
 a display device;
 a camera;
 one or more processors; and
 one or more computer readable media coupled to the one or more processors and comprising computer readable code which, when executed by the one or more processors, causes the one or more processors to:
  detect that the camera is capturing video data comprising a plurality of frames;
  in response to detecting that the camera is capturing additional video data, monitor one or more system resources for the camera;
  detect, based on the monitoring of the one or more system resources, that one or more parameters for the one or more system resources satisfy a predetermined condition by applying a prediction model to determine a probability that one or more frames are likely to be dropped based on a usage of the one or more system resources; and
  in response to determining that the one or more parameters for the one or more system resources satisfy the predetermined condition, presenting an indication that the video data is likely to be missing frames.

14. The system of claim 13, wherein the computer readable code, when executed by the one or more processors, further causes the one or more processors to:
 receive, in response to the indication that the video data is likely to be missing frames, user input requesting repair of the video data; and
 cause the video data to be repaired.

15. The system of claim 14, wherein the computer readable code to cause the video data to be repaired further causes the one or more processors to transmit the video data to a remote device for repair.

16. The system of claim 14, wherein the computer readable code to cause the video data to be repaired further causes the one or more processors to:
 apply a repair model to the plurality of frames to generate one or more replacement frames,
 wherein the one or more replacement frames are based on at least a first frame of the plurality of frames prior to the one or more frames, and a second frame of the plurality of frames after the one or more frames.

17. The system of claim 16, wherein the repair model is based on a generative network.

18. The system of claim 16, wherein the one or more replacement frames are generated by interpolating the one or more replacement frames from the first frame and the second frame.

19. The system of claim 13, wherein the one or more system resources comprise at least one of memory usage, processor usage, temperature of the system, age of the system, current frame rate, and memory properties.

20. The system of claim 13, wherein the indication indicates that the video data is repairable.

* * * * *